(12) United States Patent
Gershteyn

(10) Patent No.: US 11,080,765 B2
(45) Date of Patent: *Aug. 3, 2021

(54) METHOD AND SYSTEM FOR DATA STRUCTURE CREATION, ORGANIZATION AND SEARCHING USING BASIC ATOMIC UNITS OF INFORMATION

(71) Applicant: Igor Gershteyn, Wantagh, NY (US)

(72) Inventor: Igor Gershteyn, Wantagh, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,039

(22) Filed: Jan. 24, 2019

(65) Prior Publication Data

US 2019/0156376 A1 May 23, 2019

Related U.S. Application Data

(63) Continuation-in-part of application No. 15/822,943, filed on Nov. 27, 2017, now abandoned, which is a continuation of application No. 14/211,143, filed on Mar. 14, 2014, now Pat. No. 9,830,620.

(60) Provisional application No. 61/785,562, filed on Mar. 14, 2013.

(51) Int. Cl.
*G06Q 30/02* (2012.01)

(52) U.S. Cl.
CPC ......... *G06Q 30/0277* (2013.01); *G06Q 30/02* (2013.01)

(58) Field of Classification Search
CPC .................................................. G06Q 30/0277
USPC ...................................................... 707/752
See application file for complete search history.

(56) References Cited

U.S. PATENT DOCUMENTS

| | | | |
|---|---|---|---|
| 5,354,086 A | 10/1994 | Mueller | |
| 5,524,726 A | 6/1996 | Wright, Jr. | |
| 5,893,424 A | 4/1999 | Hisada | |
| 6,173,983 B1 | 1/2001 | Moore | |
| 6,663,129 B1 | 12/2003 | Smith | |
| 6,719,316 B1 | 4/2004 | Anthony | |
| 6,957,821 B2 | 10/2005 | Gorman et al. | |
| 7,108,273 B2 | 9/2006 | Hunwardsen | |
| 7,155,336 B2 * | 12/2006 | Dorfman | G06Q 30/018 701/482 |
| 7,234,558 B2 | 6/2007 | Toftner | |
| 7,264,255 B1 | 9/2007 | Winfrey | |
| 7,272,501 B2 * | 9/2007 | Dorfman | G06Q 30/018 701/484 |
| 7,641,212 B1 | 1/2010 | Liao et al. | |
| 7,698,336 B2 * | 4/2010 | Nath | G06F 16/9537 707/737 |

(Continued)

*Primary Examiner* — Sheree N Brown
(74) *Attorney, Agent, or Firm* — Sean R. Wilsusen, Esq.; Carter, DeLuca & Farrell LLP

(57) ABSTRACT

A computer-implemented method for organizing data using basic atomic units of information includes generating an object of interest (OI) comprising an OI name and an OI description. The OI is a basic atomic unit of information. The OI comprises an audience and data associated with the OI is searchable. The method includes assigning one or more characteristics to the OI. The one or more characteristics of the OI are searchable. A first OI is linked with one or more second OIs having at least one overlapping audience or characteristic. The second OI is accessible by a link displayed in the first OI. The first OI is displayed in a visual format that is accessible to a plurality of users.

10 Claims, 4 Drawing Sheets

(56) References Cited

U.S. PATENT DOCUMENTS

| | | | |
|---|---|---|---|
| 8,379,913 B1 * | 2/2013 | Robinson | G06K 9/6254 |
| | | | 382/100 |
| 8,733,205 B2 | 5/2014 | Fromby et al. | |
| 8,949,196 B2 * | 2/2015 | Duleba | G06F 16/29 |
| | | | 707/673 |
| 9,237,420 B2 * | 1/2016 | Frank | G01S 5/0252 |
| 9,278,360 B2 * | 3/2016 | Mankosa | B03D 1/245 |
| 2003/0061211 A1 | 3/2003 | Shultz et al. | |
| 2004/0222613 A1 | 11/2004 | Cramer | |
| 2006/0238382 A1 * | 10/2006 | Kimchi | G01C 21/26 |
| | | | 340/995.1 |
| 2006/0247845 A1 * | 11/2006 | Cera | G08G 1/13 |
| | | | 701/117 |
| 2007/0124330 A1 * | 5/2007 | Glass | G06F 16/5854 |
| 2007/0278765 A1 | 12/2007 | Dugan | |
| 2008/0296878 A1 | 12/2008 | Pruit | |
| 2009/0063470 A1 | 3/2009 | Peled et al. | |
| 2009/0320639 A1 | 12/2009 | Segato et al. | |
| 2013/0218969 A1 * | 8/2013 | Yerli | G06F 16/29 |
| | | | 709/204 |
| 2015/0058427 A1 * | 2/2015 | Grignon | G06Q 10/10 |
| | | | 709/206 |
| 2015/0137479 A1 | 5/2015 | Gershteyn | |
| 2015/0262391 A1 * | 9/2015 | Chau | G06K 9/00476 |
| | | | 345/440 |
| 2015/0286868 A1 * | 10/2015 | Flores | G06T 7/38 |
| | | | 382/103 |

\* cited by examiner

FIG. 3

METHOD AND SYSTEM FOR DATA STRUCTURE CREATION, ORGANIZATION AND SEARCHING USING BASIC ATOMIC UNITS OF INFORMATION

CROSS-REFERENCE TO RELATED APPLICATION

This application is a continuation-in-part of U.S. patent application Ser. No. 15/822,943, filed on Nov. 27, 2017, which is a continuation of U.S. patent application Ser. No. 14/211,143, filed on Mar. 14, 2014 and issued as U.S. Pat. No. 9,830,620, which claims priority from U.S. Provisional Patent Application No. 61/785,562, filed on Mar. 14, 2013, the entire contents of which are incorporated by reference herein.

TECHNICAL FIELD

The present disclosure relates to a method and system for data structure creation, organization and searching using basic atomic units of information over a networked environment.

SUMMARY

The present disclosure relates to a system and method for creating, organizing and searching a data structure using basic atomic units of information.

In embodiments, basic atomic units of information are defined and referred to as "objects of interest (OIs)."

BRIEF DESCRIPTION OF THE DRAWINGS

Various illustrative embodiments of the present disclosure are described herein with reference to the drawing, wherein:

FIG. 3 is a screen shot of a listings screen visible to a user according to exemplary embodiments of the present invention.

DETAILED DESCRIPTION

Figure 1:
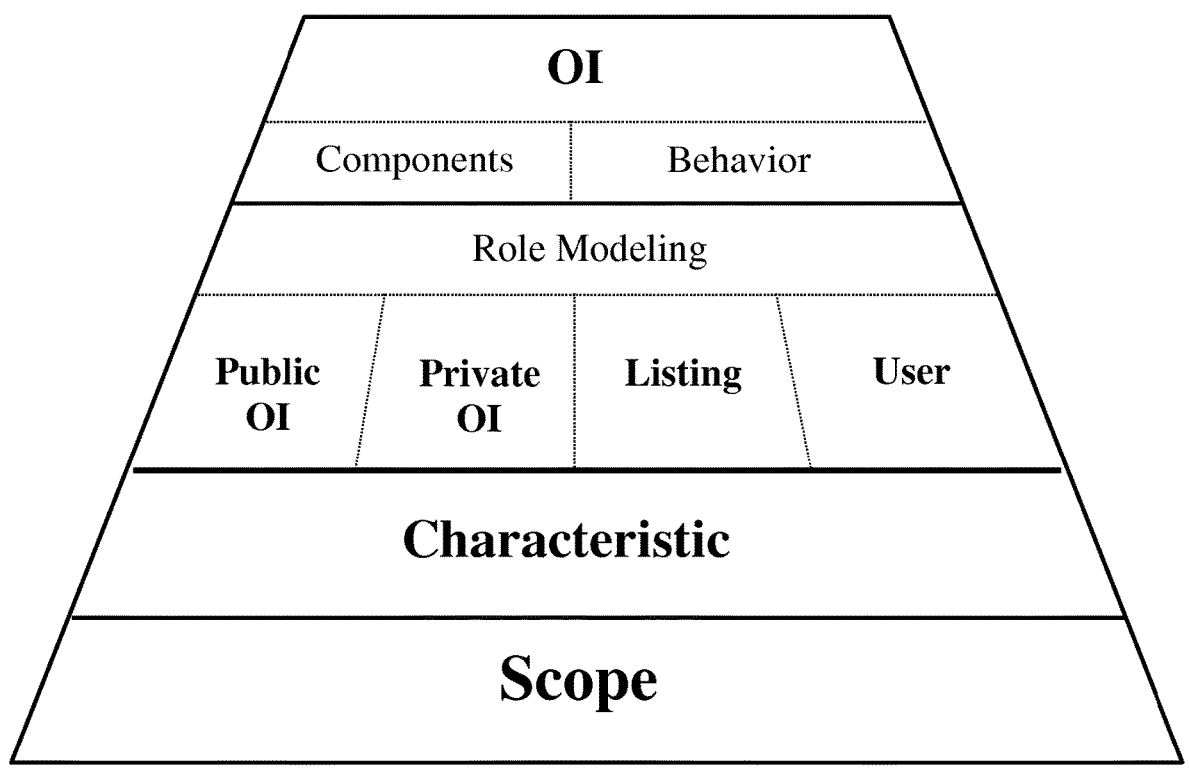
FIG. 1 is a diagram representing a conceptual organization of the method and system described herein according to exemplary embodiments of the present invention.
Figure 2:
FIG. 2 is a screen shot of an initial screen visible to a user according to exemplary embodiments of the present invention.
Figure 3:
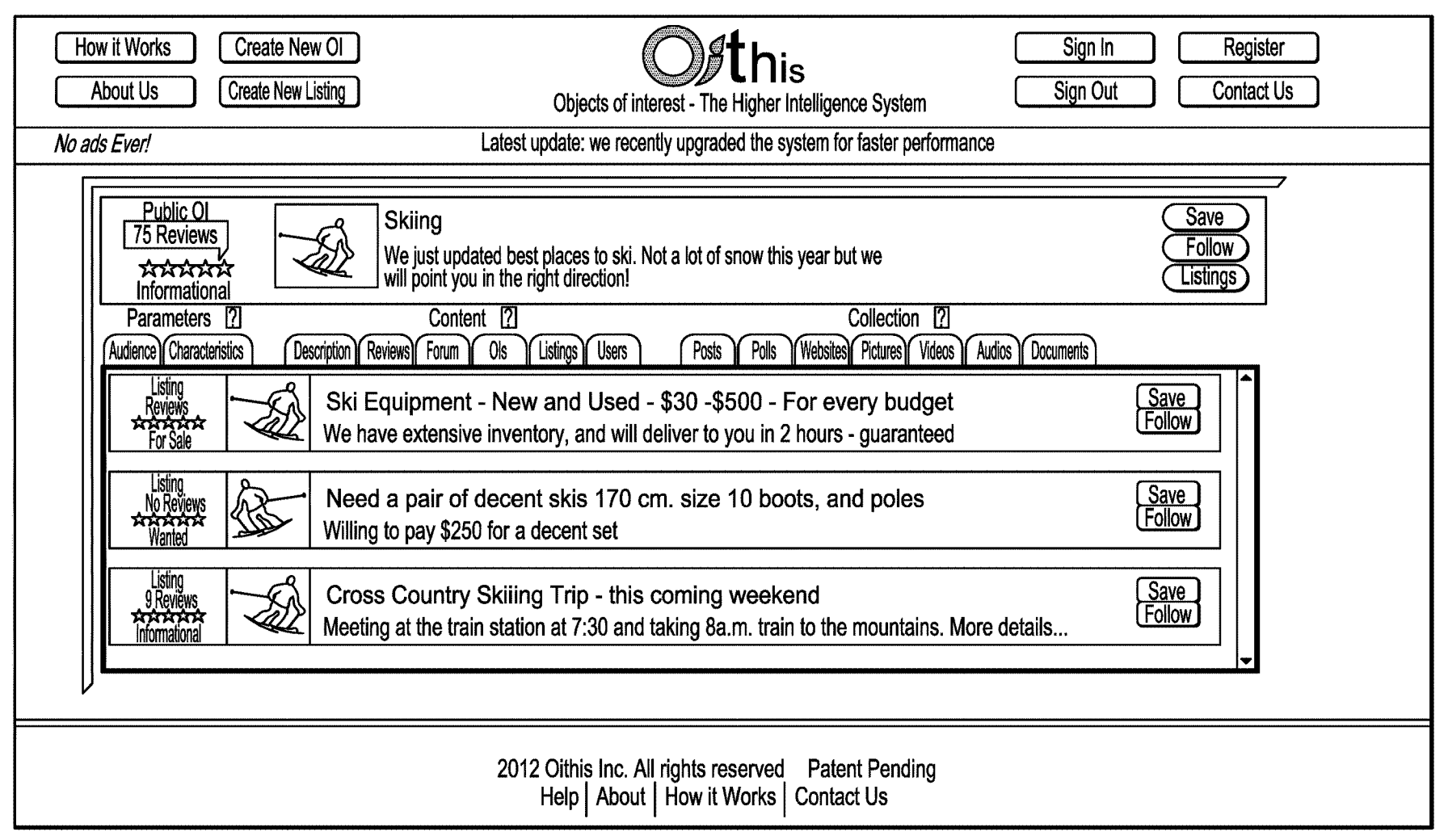

With reference, to FIGS. 1-3. The application is founded on a few fundamental objects. They are Object of Interest ("OI"), Characteristic, and Scope.

With reference, to FIG. 1. Scope is the most fundamental object—it must be associated with every object above it in the pyramid. OIs and Characteristics are meaningless without their respective Scopes. A more user friendly term Audience has the same meaning as term Scope, and may be used to describe user oriented instances such as examples, and screen shots. The terms Audience and Scope may be used interchangeably herein.

With reference, to FIG. 1. Scope of an object defines how an object "thinks" of itself, and that's how other entities view such object. This is a traditional understanding of scope. Every object must have a Scope.

With reference, to FIG. 1. External Scope defines how an object "looks" at other objects—this is an external view at other objects. An object may have more than one External Scope. However, only one External Scope can be used at a time. Whatever External Scope is used at a given point of time is called an Active (External) Scope. External Scope may or may not be associated with an object.

With reference, to FIG. 1. Characteristic is the next higher level object. Although not mandatory, it can be associated with any OI. Applying characteristics to OIs allows to describe their certain qualities and search by such additional criteria, for example, their respective characteristics. It's worth pointing out that only those characteristics can be assigned to OIs which have Scopes that are similar to those of OIs. There are two types of characteristics: system characteristics—used by the application itself and not visible to users, and non-system characteristics—defined by users and visible to users.

With reference, to FIG. 1. Object of Interest (OI) is a dynamic object which consists of a number of Components whose Behavior can be different.

With reference, to FIG. 1. Other derived objects can be modeled by adjusting the use of OI Components and their Behavior. They are Public OIs, Private OIs, Listings, and Users.

Scope

Scope is defined as the combination of the following components: Geography, Language, Age, and Gender. It should be obvious to a user what the scope is by enabling the user to view the scope within the context of the displayed information.

Two different scopes are considered similar if they intersect, i.e. have common partial Geography, Language, Age, and Gender.

Geographic Area

Geographic Areas indicate associated geographic areas for a given object. They are saved by the application as polygons. All commonly referred to geographic areas such as zip codes, neighborhoods, metro areas, counties, states, provinces, countries, continents, and others as well as user defined polygons, points, or circles are converted to their respective polygons. We provide an initial set of widely recognized geographic areas because many users will want to use those instead of defining their own. The application will rely on existing mapping interfaces (e.g., Google maps or a similar provider) in order to bring the maps on the screen, and select geographic areas as polygons.

Languages

Languages indicate associated languages for a given object. It does not have direct relationship with the actual language in which an object and its associated information is expressed. It is simply an attribute assigned to an object as a matter of defining its scope. Most if not all known languages should be allowed. Multiple languages can be assigned. We will limit initial implementation to Latin family of languages because they all use similar alphabet. The application should adjust all related text, explanations, messages, etc to be expressed in the language any given user selects as their primary language.

Age Ranges

Age Ranges indicate associated ages for a given object. A single age range can be expressed in fractional ages (e.g.

20.000-21.500). Both lowest and highest ages are inclusive. If there is a need to exclude one of the ranges its value should be incremented (for the lowest range) or decremented (for the highest range) by the value which corresponds to one day, i.e. 1/365=0.00274. For example, if the range above needs to be all exclusive, it will be adjusted as all inclusive range of 20.003-21.497. For display purposes, the range should be displayed without adjustments, i.e. as 20-20.5 as it was entered—while some sort of 'inclusive' or 'exclusive' indication should be used to make it clear to a user.

As a default behavior, the application may be inclusive of the lowest range value while being exclusive of the highest range value. However, the application should allow for any selection of inclusion/exclusion for either of the range lowest/highest values.

A specific age is described as an all inclusive range where lowest and highest values are the same.

An open ended age range such as "above 30" is described as 30.0-1000. An open ended age range under 20 is described as 0-20.

Genders

Genders represent associated genders for a given object. To clarify, gender of humans is represented by body (male or female) and personality (male or female). Therefore, true gender is determined by the combination of body and personality as follows: Mm, Ff, Mf, and Fm. Because the first two classifications define the same body and personality they can be shortened, and the resulting list will look as follows: M, F, Mf, and Fm. The system and method according to exemplary embodiments of the present invention is flexible to accommodate any desired variation of gender for an object.

Characteristics

An OI, a Listing, and even a User may optionally be described by one or more formal Characteristics which are uniquely identified by the combination of Characteristic Name and its respective Scope. System Characteristics are used by the application itself. Users can never view System Characteristics. However, all characteristics may be searchable.

Characteristic name. For example, 'Cloth Color', 'Suite Size', 'Working Hours', etc. The application recommends, but not enforces capitalization rules to have the first letter in uppercase while the rest in lowercase.

Characteristic type—how this characteristic is described. The following basic types are allowed. Basic types are used to create the actual characteristics.

A single numeric value with optional unit of measurement. For example, product/service PRICE with unit of measurement "dollar". FURNITURE DIMENSION in inches.

A single text value. For example, BRIDE'S NAME is "Jennifer Norton", JOB POSITION is "Store Manager".

A list of sequential numeric values with optional unit of measurement. The values are specified in a certain order, and the search for values can be done by indicating not only a specific value but also by a range of values. For example, a suit SIZE can be "34, 36, 38, 40, 42, 44, 46, 48" with unit of measurement "inch", so someone can look for a suit within a range of let's say sizes "34"-"38".

A list of sequential text values with optional unit of measurement. Similar to above. For example, picture frame sizes can be "5×7", "7×9", "11×13", "14×17", "19×26" with the unit of measurement "inch", so someone can look for frames let's say within sizes "7×9"-"14×17".

A list of random numeric values with optional unit of measurement. The values do not have specific order. For example, COLOR CODES can be "21, 14, 79, 125", etc.

A list of random text values with optional unit of measurement. The values do not have any specific order. For example, a jacket COLOR can be "RED", "BLUE", "WHITE", or "YELLOW". A certain product MATERIAL can be "WOOD", "METAL", or "PLASTIC".

A list of numeric ranges with optional unit of measurement. E.g. the length of a product can be anywhere within "40-60 inches", the duration of service can be within "1.5-3 hours", the working hours can be within "9 am-1 pm" and "2 pm-7 pm".

Managing characteristics is done as follows. Any user is free to create a new characteristic or add values to the existing characteristic, and use it immediately by assigning it to an OI, a Listing or to himself as a User. This initial approach greatly simplifies the use of characteristics, however may create a bit of a chaos. Alternatively, every new characteristic may need to be approved by an automated process and/or devoted personnel.

Objects of Interest

With reference to FIGS. 1-3 n Object of Interest (OI) may consist of the following components:

Name. An OI Name may have a maximum length of 120 characters. All printable characters are allowed in OI Name. Whenever an OI is supplied, both leading and trailing spaces are removed. Multiple spaces inside OI name are left alone. OI Name uniqueness is not case sensitive, i.e. every OI Name converted to upper case must be unique among all other OI names converted to upper case. For instance, OI names "Italian Cooking", "italian cooking", and "ITALIAN COOKING" would all be considered identical. For display purposes every OI is displayed as it was entered.

Status is the latest update for an OI and may be displayed as a relatively short block of text.

Payment Email. This email is used when handling payments.

Intent indicates the purpose of an OI as follows: Informational (provide information); Buy (OI wants to get something and give money in exchange for that), Sell (OI wants to give something and get money in exchange for that), Trade (OI wants to get something and give something besides money in exchange for that), Looking for something (OI wants to get something which does not involve clearly defined exchange), Offering Something (OI wants to give something which does not involve clearly defined exchange), Alert (OI wants to alert others regarding something).

Thumbnail. This is a small picture shown when OI is displayed in a limited space.

Rating Poll is a system generated poll for every new OI in the system. It is always a Privacy Flexible poll as explained in this document. Whenever a group of OIs is viewed, the OIs are always sorted by the best rating first, and the rating is shown next to OI names.

Forum. This is a discussion forum consisting of posts or polls submitted by users. Posts may have replies by other users. A post and a reply may contain text and graphics.

Related Posts. Selected individual posts with their respective replies.

Related Polls. Selected individual polls.

Related Websites. Includes thumbnail, link (to the website), and brief description.

Related Pictures. Includes thumbnail, link (to the picture), and brief description.

Related Videos. Includes a thumbnail, link (to the video), and brief description.

Related Documents. Includes a thumbnail, link (to the document), and a brief description.

Related Audio. Includes a thumbnail, link (to the audio), and a brief description.

TABLE 1

OI Components and their use for Public OI, Private OI, User and Listing

| OI Component | Public OI | Private OI | User | Listing |
|---|---|---|---|---|
| Name | X | X | X | X |
| Scope | X | X | X | X |
| Description | O | O | O | O |
| Status | O | O | O | O |
| Email | O | O | X | O |
| Password | — | — | X | — |
| Payment Email | — | X | X | — |
| Time Zone | X | X | X | X |
| Primary Language | X | X | X | X |
| External Scopes | — | — | X | — |
| Intent | X | X | O | X |
| Thumbnail | O | O | O | O |
| Rating Poll | X | X | X | X |
| Forum | X | X | X | X |
| Related OIs | O | O | O | O |
| Related Users | O | O | O | O |
| Related Listings | O | O | O | O |
| Related Posts | O | O | O | O |
| Related Polls | O | O | O | O |
| Related Websites | O | O | O | O |
| Related Pictures | O | O | O | O |
| Related Videos | O | O | O | O |
| Related Documents | O | O | O | O |
| Related Audio | O | O | O | O |

Legend: X—always, O—optional (i.e. user's choice), — does not apply.

TABLE 2

OI Behavior for Public OI, Private OI, User and Listing

| OI Behavior | Public OI | Private OI | User | Listing |
|---|---|---|---|---|
| Name Unique among similar scopes | Yes | Yes | No | No |
| Admin can be voted out by other users | Yes | No | No | No |
| Creation/Maintenance fee is charged | No | Yes | No | No |
| Listing specific fee is charged | No | No | No | Yes |
| Can be sold to another user | No | Yes | Yes | No |
| Challenging scope (same name) | Yes | No | No | No |
| Users can relate (associate) themselves | Yes | If allowed | After approved | No |
| Admin controls what others can and cannot do | No | Yes | Yes | Yes |
| Can be defined as a reference to another OI | No | No | No | Yes |
| Ability to reflect a characteristic in name/description | Yes | Yes | Yes | Yes |

Ability to reflect a characteristic in name/description. For both Title and Body there should be a way to display characteristics within the title/body by means of referencing. For example, a price of a product/service may be represented by a listing characteristic. When the listing is prepared, a user should be able to indicate that he wants the price to be presented in a certain place of a title or body. This way, when the listing or the title is displayed it accurately shows the price. If a user changes the price of a listing, it is automatically adjusted when the listing is displayed—both in title and in full form.

Any OI component can be renamed by their admins/owners to more accurately describe their meaning. For example, 'Description' can be replaced with 'About Me', or 'What it's all about?'. 'Forum' can be replaced with 'Discussions', or 'Let's talk about it'. 'Permissions' can be replaced with 'Who can access'. 'Reviews' can be replaced with 'What others think about it'. And so on.

Displaying OIs, Users and Listings

Referring to FIG. 2, OIs are initially displayed in short form as Thumbnail (of an optional picture), and name. A short form may be presented in a rectangle whose dimensions are adjusted based on the size of the screen.

Various symbols are used throughout the application to visually present various information. Font, color and other features may be presented differently for Public OIs, Private OIs, Users, and Listings to avoid any confusion for the users.

Private OI Fees

Private OI Monthly Scope Fee (MSF) in US$ is calculated based on average values of scope components. Every scope component is assigned a number of points.

For a geographical area, the points S are equal to the size of an area in sq miles. For languages, the points are equal to the number of languages L.

For the age range, a single point is assigned to every age range (partial inclusion is prorated) for the following age ranges: 0-3-5-8-11-14-17-21-25-30-35-40-50-60-70-90-120-1000. The combined points for all covered age ranges represent age points A. For example, the range of 14-21 is assigned 2 points.

Gender points G are assigned as follows. 1 point is assigned to a single gender, and 2 points are assigned to more than 1 gender.

The adjusted scope (which is fairer) is calculated as the multiplication of the component points above. Adjusted scope=S*L*A*G The final MSF is calculated using the following formula. MSF of less than $0.01 is assumed to be zero. MSF=3*[lg (adjusted scope)−1.00]

Private OI Creation Fee (CF) equals MSF. CF=MSF

Private OI Monthly Content Fee (MCF) is charged in US$ based on average monthly space in Megabytes taken by all OI content excluding space for listings. MCF of less than $0.01 is assumed to be zero. It is calculated as follows: MCF=3*[lg(space)−1.00]

Private OI Bandwidth Usage Fee (BUF) is charged in US$ based on monthly bandwidth usage in Megabytes excluding bandwidth for placing and viewing of listings. BUF of less than $0.01 is assumed to be zero. It is calculated as follows: BUF=lg(bandwidth)−3.00

Private OI total Monthly Fee (MF) is the sum of other monthly components: MF=MSF+MCF+BUF Private OIs with narrow scope (10 sq miles, 1 language, 1 age range, 1 gender), with light content (less than 10 Mb), and moderate bandwidth usage (less than 1000 Mb per month) are absolutely free. An OI for a typical user falls into this category.

Moderately exceeding parameters above creates a small yet manageable fee. For example, for a slightly broader scope (20 sq miles, 1 language, 2 age ranges, and 2 genders), content of 20 Mb, and bandwidth of 1500 Mb the monthly fee comes to $3.78.

Even for a significant usage the monthly fee is reasonable. For example, for a large scope (10,000 sq miles, 3 language, 10 age ranges, and all genders worth 2 points), content of 1000 Mb, and bandwidth of 10,000 Mb the monthly fee comes to $21.33. The presented fee structure is only one possible configuration to calculate fees in order to account for Private OI scope, data storage, and bandwidth usage. Other components may be introduced into fee calculation logic.

OI Variations Examples

A public OI "Babylon Steakhouse" may have the following characteristics: the application assigned system characteristic 'OI is Private' is set to "No". 'Service Quality' is set to "Excellent". 'Cuisine' is set to "American". 'Average Price per Person' is set to "$35.00". Working hours, busiest time, least crowded time, best dish, and other characteristics can be set in a similar way.

Listing Variations Examples

Referring to FIG. 3, Listings may include text and graphics, and a set of associated Characteristics, any of which may also be shown as part of text and graphics. 'Listing Intent' is one common and mandatory characteristic. It may have values "Buy", "Sell", "Looking for", "Offering something", "Let others know", etc.

For example, a pizzeria may place a listing offering a pizza for an OI "Pizza". Characteristic 'Listing Intent' is set to "Sell". Characteristic 'Product/Service' is set to "Product". Characteristic 'Discount' is set to 30% off. Characteristic 'Offer Period' is set to be a 4 hour window on a certain night. Characteristic 'Will Deliver' is set to "Yes". Characteristic 'Free Delivery' is set to 'Yes'. Characteristic 'Minimum Amount to Order' is set to "$10.00".

For example, an individual may place a listing to sell a car for an OI "Cars". Characteristic 'Listing Intent' is set to "Sell". Characteristic 'Product/Service' is set to "Product". Characteristic 'Vehicle Make' is set to "Honda", Characteristic 'Vehicle Make Year' is set to "2003". Characteristic 'Vehicle Condition' is set to "Good". Characteristic 'Vehicle Mileage' is set to "85,000". And so on, and so forth.

A wedding announcement listing example. Characteristic 'Listing Intent' is set to "Let others know". Characteristic 'Event Type' is set to "Wedding". Characteristic 'Date and Time' is set to a specific date/time. Characteristic 'Groom' is set to be the groom's name. Characteristic 'Bride' is set to be the bride's name.

Someone who wants to repair computers may place a listing. Characteristic 'Listing Intent' is set to "Sell". Characteristic 'Product/Service' is set to "Service".

A person who is looking for a babysitter may place the following listing for an OI "Babysitters". 'Listing Intent' is "Buy". 'Hourly Pay' is "$20.00". Characteristic 'Gender required' is "Female".

Note that there is no need to define a characteristic for geographic areas because they are part of the scope for every listing. However, a characteristic may define a geographic area.

User Variations Examples

A user may, for example, indicate his favorite hobby by setting characteristic 'Hobby' to values "Fishing", "Skiing", "Hiking", "Photography".

Same Name OIs are Allowed for Different Scopes

Such model allows for multiple OIs with the same name. It is true that a public OI admin is free to define a pretty wide scope. However, if someone else wants to create an OI with noticeably smaller scope and there is a conflict, the application will favor and give preference to such new OI. At this point, an admin of the OI with larger scope is forced to work it out with another admin of the new smaller OI—either a smaller OI should be dropped, or a bigger OI scope is reduced to avoid the conflict. If the conflict is not resolved in a short period of time and neither side is giving up, the application favors the new OI with the smaller scope, and automatically reduces the scope of the bigger OI to resolve the scope conflict.

Private OI scope cannot be challenged, and can be as wide as the owner wants it to be. This will be reflected in private OI monthly maintenance fee.

This mechanism will enforce a balanced approach throughout the OI universe. As a result, less popular OIs will end up having very few duplicated names and each of them will have a pretty wide scope, while popular OIs will have numerous duplicate names, but each of them will have a more narrow scope. What's important is that the number of duplicate OIs and their scope will automatically balance itself out based on popularity and people's interest.

For example, it is imaginable that an OI named "Skiing" will be greatly duplicated, but it will be different for different languages, geographic areas, age groups and genders. This is beneficial for the following reasons. It is only possible to communicate in the language a person knows. Because being in the same area makes it easier to get together with people, and to learn local specificity. Because skiing will and should be presented differently to kids, and to adults. Gender may or may not play a role, but ultimately it is up to the users of the application to decide what would be the right scope for every OI.

In another example, if someone creates a public OI with the name "How to color a macaroni salad?" Probably very few people on the planet would care about it. So, if such OI Admin sets up a wide scope for such OI, no one would object. As a result, such OI will stay with the wide scope.

User Registration

For an unregistered user, the application assumes geography equating to the entire USA, English language, ages under 17, and genders M, F. User's name is empty. Any attempt to perform actions applicable to registered users causes the application to prompt the user to register. Such actions include posting, replying, voting, saving information, etc.

Note that a user needs to register in order to set the age in the scope above 17. The age limit for unregistered users is designed to shield children from adult content.

Social Networking

A user may be an OI. The users are free to associate themselves with public OIs and some private OIs. The users (e.g., those represented by an OI) are free to assign themselves any characteristics. OIs might only have associated users with similar scopes. These factors create ideal conditions for those users to socialize. Such social networking approach relies on human commonalities between people. It is a more powerful concept than socializing only with a few existing friends.

It is worth pointing out that friends become friends based on commonalities in the first place—speaking the same language, residing in the same area (geography), being of similar age, and being of the same gender. Of course, there are deeper human factors involved, but the precursor of friendship is the similarity of Scope—which creates ideal conditions for making new friends.

Posting messages and exchanging ideas within the framework of a specific OI is a much more productive and stimulating process than what is currently present in social networking.

Of course, the functionality in this area is not limited thereto and can be embodied in many different forms.

When a user associates himself with an OI, such user may opt to receive email (or SMS) notifications if any or specific OI associated content changes.

Clicking on a user's name allows to view the user's public profile, posts, listings, and other activity as permitted by such user as well as sending an anonymous email—all of this set by the user in the user profile.

Protecting Children from Adult Content

A child's age (or age range) is part of their user's scope. An adult OI scope will never match a child's scope. As a result, an OI with adult content will never be seen by a child when searching for OIs.

Even if a child attempts to view an adult OI using a direct link (e.g. received in the email) or accidentally types the word "porn" instead of the word "corn" when searching for OIs, the application still enforces a match between the child's scope and an adult OI scope. If the scopes are not similar, the adult OI is not shown.

An unregistered user's scope is automatically set to be under 17 (or a different age limit consistent with local laws). This also prevents viewing of adult OIs.

When an OI Admin/Owner defines an OI scope which includes the ages of children, they have to enter a check mark on the screen indicating their consent to do their best to maintain the content suitable for children.

Geography Handling

An interactive map interface can be implemented using a respective service/API from, for example, Google. It may be free for a small number of daily requests assuming the application is also free to the users. There is a fee for commercial use. Requests to this API have a per day limit, even for the most expensive options, and therefore the suitability of this API needs to be reviewed for a long term solution.

When the user needs to define a geographic area (or a location), the application brings up an interactive map. The user may key in any generally acceptable geographic information such as an address, zip code, town, state, metro area, country, region, etc. The application displays a corresponding map with the appropriate zoom level which the application can control via the API. The user may define a location on the map by clicking in the appropriate place on the map. The user may define an area as a polygon by drawing a poly line via multiple clicks on the map which ends where it started effectively forming a polygon. Once the polygon is identified, it is shaded with a partially transparent color of choice. In a similar fashion, the user may define a location point, or a circle.

The user gives the area a name. Later on, whenever the user needs to refer to this area, it can be done by its respective name. Whenever the user needs to view/edit the area, the same map with the shaded polygon is shown to the user enabling the user to edit the area.

The application captures the coordinates of the defined geographic area/location. Whenever a search by a geographic area is performed in order to find matching areas for a specified test area, every area is geometrically compared to a test area. If the areas intersect (have common area), such area is included in search results.

A proprietary approach will be used to effectively and quickly find matching geographic areas regardless of how many areas need to be searched. This will assure the application's satisfactory latency and performance even for a significant number of OIs, Users, and Listings measured in billions.

Managing OIs

Every OI is managed by a single Admin. When a user creates a public OI, he automatically becomes its Admin.

A public OI Admin is responsible for setting up and maintaining most OI Properties except Posts, Listings, Polls, and related Users. Admin is also overseeing user supplied content such as posts, listings, and related users and has the right to remove objectionable content, and block offending users. Admin is also reviewing incoming user feedback (emails), and reacts accordingly. Public OI Admin may be challenged by another user as detailed below. When a user creates a private OI, such user automatically becomes its Admin, and has full control over the OI's properties and content. Other users can be limited by the Admin as to whether they can post and what content, reply to posts and with what content, place listings, etc. An Admin of a private OI can be interchangeably referred to as an OI Owner.

Ownership Transfer of Entire Private OI

An Owner of a private OI can sell the entire OI to another user for a mutually agreed upon price. The application facilitates this process, and assesses a fee (e.g. 5% of the sale price) for the transfer of ownership. As soon as the transfer is complete, the application makes another user an OI Admin.

Ownership Transfer of a Private OI Name Only

An Owner of a private OI can sell such OI's Name only, along with its Scope, but not the components (content) of such OI. It is sold to another user for a mutually agreed upon price. The application facilitates this process, and assesses a fee (e.g. 5% of the sale price) for the transfer of the name and its internal scope ownership. The OI Name and its Internal Scope being transferred are assigned to the specified buyer's Private OI, while at the same time the OI Name of the seller's OI is modified by the system to make it different (e.g. by adding a system generated number to the OI Name).

Polls

The functionality associated with polls is an important part of this application. The application recognizes three types of polls: Approval Poll, Rating Poll, and a Free Form Poll.

Approval Polls might offer only two choices—Approve or Disapprove. The result of the poll is indicated as a percentage of approval. For example, if 100 people vote, and among them 80 people approve and 20 people disapprove, the poll results in 80% approval.

Rating Poll offers to rate something on a certain scale (e.g. 0 to 10, or 1 to 5, etc). For example, if 100 people participate in a poll with 20 people rating something as zero, while 80 people rating something as 10, the overall rating comes to 8.0. In another example, if 20 people rate something with 10 people rating it as 6 while another 10 people rating it as 10, the overall rating is also 8.0.

A Free Form Poll offers two or more choices on anything.

An Approval Poll, Rating Poll, and a Free Form Poll with two choices are all similar in nature and their results can be compared despite their seemingly different nature. For instance, the two poll examples above produced identical results. e.g., approval of 80% is the same as the rating of 8.0 on a scale of 0-10.

While voting, a user may optionally leave a voting comment of sufficient length (e.g. up to 600 characters long) which supplements his vote. These comments (but not necessarily user names) can always be viewed by others.

Privacy wise, polls could be of the following types: Privacy Forced Anonymous, Privacy Forced Disclosure, and Privacy Flexible.

Privacy Forced Anonymous poll results never show user names. Privacy Forced Disclosure poll results always show user names, therefore those users who want to stay anonymous should not participate in such polls. Privacy Flexible poll results let the voters decide whether their screen names are shown in the poll results. By default, a user's screen name is not shown in voting results for Privacy Flexible polls.

Voting results can be viewed as a Voting Summary (a typical poll results) or as Voting Details showing individual votes. Viewing Voting Details allows to always view voting comments, and sort poll results by time, user name, and user rating.

By default, a Voting Summary indicates results for the entire duration of the poll. However, a user should be able to view any Voting Summary for different durations such as the past day, week, month, year, or a custom range.

Users may change their votes at any time unless the poll is closed.

Every object of this application such as OI, User, and Listing is automatically assigned a Rating Poll, Privacy Flexible. Every user of this application may cast their vote in such polls. Every user is able to view such polls.

Graphically, a poll may be presented in a traditional multiple choice selection, or as a simple "Like"/"Dislike" buttons, or thumbs up/down symbols. Pressing the symbol may also pop a small prompt to explain voting decision.

OI Related Discussion Forum

Discussion Forum is very similar to known discussion forums. Posts are used to discuss anything related to an OI. This will represent a single forum (not multiple forums which is typical for various websites) because it is devoted to a single OI. Posts should look like your typical message board post—text, with the ability to change font, color, etc, embed a picture, video, provide a web link, etc.

An admin can select and save any post or poll in OI related content if they present a perceived value to the users.

Any user may start a Poll in a similar way and a post may be created. Privacy Flexible Polls only are created. The user defines Poll Title, the type of Poll, and the choices. There is no discussion associated with a poll. Whatever users want to say they are free to provide an optional voting comment along with their vote.

Posts and Polls are shown within the same space, and are displayed in the following order—most recent post/poll modified is shown first (a typical rule for a forum). A user is able to sort such results by other available criteria, e.g. post/poll rating, time created, etc.

An OI admin may remove, edit, or replace an objectionable post/poll. The removed or original post/poll is not actually deleted, but rather gets moved by the application to Removed/Modified Posts/Polls Area which can be viewed by users. The purpose of such approach is to strike the balance between administrative power of an OI Admin and regular users. On one hand, an admin may remove any post he feels is objectionable. As a result, other user won't be able to see them within a forum. However, if users really want to, they may go to the removed posts area for this OI, and still view removed posts. Removed posts area is not open to web crawlers typically utilized by search engines such as Google, Yahoo!, and others.

If there is a justifiable need to permanently remove a post, an admin needs to contact Oithis.

OI Related Selective Content

OI related selective content is presented separately for Related Posts, Polls, Websites, Pictures, Videos, Documents, Audio Files, etc. These are items manually selected in one way or another because of their certain value. Note that Related Posts are similar to sticky posts in a typical forum.

Such subdivision is done primarily for the convenience of the users. Different types of content can be implemented in a very similar way because any type of content is presented as HTML created by an OI admin.

The application may offer a few useful templates defining the placement of pictures, text, etc., so the user can fill the necessary parts.

The application allows the creation of useful categories for selective content in order to conveniently place it in one category or another. For example, a user may decide to have such categories as Skiing, Work Related, Vacation, etc. Such categories might not be searchable, but might be presented when viewing an OI/User/Listing.

Payments

The application may facilitate the actual transfer of money between the users themselves, and between the users and Oithis.

In order to avoid micro payments to Oithis for the placement of listings, the application may require users to deposit a minimum amount of a few dollars into their Oithis money which can be used to pay for listings. The unused funds are fully refundable minus the fee held by PayPal or a similar service. Listings cannot be submitted unless there is enough money in Oithis account.

If a user wants to pay for a product/service, the money transfer is done directly to the seller through a commercial payment service like PayPal.

If a user needs to pay to Oithis a fee (e.g. for OI/Name transfer) it is done directly through a commercial payment service like PayPal.

Such approach would allow the application to facilitate its commercial part making it attractive to all users.

The system should always maintain two types of funds for each user—credits and money—with the rule that credits are always used first when paying any type of service fees to Oithis. This would provide an important mechanism to offer promotions, free service, credits, adjustments, etc, while at the same time maintaining the notion that nothing is free and has to be paid for.

If implementing actual payments cannot be done, the application may work with credits only. The users may temporarily replenish their credits for free by simply pressing a respective button.

Listing

Listing is a way of presenting a relatively small amount of information with the purpose of being useful to other users while also benefiting the submitter in one way or another. Listings are modeled after OIs.

An ad is a Preferred Choice Listing. The only difference is that an ad is displayed up front in short form without any search.

When the user clicks on a Products/Listings link while viewing any OI on any page of the application, the user is presented with Products/Listings page. A small number (e.g. one, two, or three) ads are being displayed in short form based on a few factors as explained below, followed by listing search fields, followed by a limited number of listings in short form. The total number of displayed listings depends on the screen size, e.g. 5 for a small screen, and 20 for a large screen, and so on.

Because it is not possible to predict the exact number of views, there will never be a perfect match between the number of actual views and the number of ads to be displayed. The system tries to adjust the pricing of ads to achieve a perfect match and to have one ad for every view. If it turns out that there is excessive number of actual ads to display for the estimated number of available views, the system will show up to 2 or 3 ads at a time in order to provide views for all subscribed ads.

The system may also decide to show 2 or 3 ads at a time as a matter of more effective presentation. The same pool of ads will be shown on a rotating basis.

A user may refine listing search criteria and look for specific listings by Scope, Intent, Characteristics, and Title. No search can be done by the words from the body of a listing. In other words, the text within the body of a listing is not searchable.

Since the number of listings can be unlimited, there arises an issue of how to aid users in finding the listings of higher quality. A simple thing to do would be to display listings based on the ratings of the users who submitted them along with the rating of individual listings if available. This way, listings of lower rated users will be pushed at the end of any list of displayed listings, and in case of excessive number of listings the users simply won't see the listings from low rated users.

Ads and listings are not displayed everywhere else ensuring an ad free environment for users.

A listing or an ad can be submitted by any user, and associated with any public OI, or with a private OI if a user is authorized to do so. The application charges for listings and ads regardless of whether they are submitted for a public or a private OI.

A private OI admin may opt to pay all listing/ad fees.

A user may re-list an expired listing, and optionally modify it while doing so. In such case, any statistics accumulated for such listing stays, including the listing approval rating.

Pricing of Listings and Ads

For every OI, the application allocates hourly time slots—which are the minimum quantum of listing/ad duration. For every time slot, the application estimates the number of views—this is the number of times users will view an ad or a listing. Such estimation is based on available historical data. This could be an average for a few past hours, or for similar hours of the past days, or even same hours of the previous week/day. For example, a certain hour of the future Friday night is presumed to have the same number of views as the same hour of the most recent Friday night. This is primitive, but simple and effective estimation which can be improved in the future.

For the purpose of optimization, it is presumed that for each view of products/services/listings page a user views the displayed ad in short form, and views one listing in short form. The most optimal ratio for a given time slot is to have as many ads, and as many listings as the estimated number of views.

Whether the users click on listings or not should not affect the pricing of any given listing. The application allows anyone to equally promote their listings, and therefore the charge for listings should not depend on the fact of clicking on the listing. The only reason a user would click on the listing is because the content of the listing interested the user enough to prompt him to click, and therefore the credit for this action goes to the submitter of the listing and not to the application.

The pricing model below relies on a few pricing adjustments worth mentioning in detail.

The Unsold Inventory Discount gives a significant discount to the first buyer while gradually removing the discount for follow up buyers so that the last buyer of the available inventory gets no discount at all. This discount represents the supply part of any market—as supply increases, the prices drop.

The Expiration Discount takes place when the sale inventory expires at a certain point in time. As the expiration time is far away, the discount is zero. However, as the expiration time nears, the discount grows reaching its maximum at the expiration point.

The Quantity Discount applies for somewhat unlimited sale inventory when excessive numbers of purchases occur. The discount is zero for non-excessive purchases, but kicks in for excessive purchases, and gets deeper for follow up purchases. As the number of purchases increases the discount eventually stabilizes at a certain preset level.

The Oversold Inventory Premium applies when all available ad inventory has been sold. The premium is zero for all purchases within available inventory, but after that, it kicks in and grows exponentially with no limit. This premium represents the demand part of any market—as demand increases, so do the prices.

The Popularity Premium applies to non-market driven pricing. It reflects the additional exposure a listing gets due to increase in the number of views a listing receives. The premium grows logarithmically based on the number of views, and may grow with no limits.

An ad or a listing is always submitted for a certain period of time. The system calculates the price for every hour of such period. The sum of hourly prices is the final price of an ad/listing for the entire period.

The Volume Discount applies to the final price of an ad/listing based on the user's previous spending. This represents a typical discount for volume buyers. It is zero for small volumes, then grows, and eventually stabilizes around certain percentage (e.g. 20%).

Hourly Pricing for Ads is done as follows. The base price of an hourly slot and the number of future views for ads is estimated based on available most recent historical data for ads—same hour of the most recent day, same hour of the previous week/day, the weighted combination of both, or the average for the same hour for the past few days. Then, the base price is adjusted using the Unsold Inventory discount, the Expiration Discount, and the Oversold Inventory Premium. Estimated views is the available inventory, and the beginning of the hourly time slot is the expiration point.

Hourly Pricing for Listings is done as follows. The number of future views for listings is estimated based on the historical data for listings—similar to how it's done for ads. The base price of a time slot for a listing is fixed—it is global, although it could be different for different geographical regions. Then, the base price is adjusted using the Popularity Premium, the Unsold Inventory Discount, and the Quantity Discount.

The application should adjust prices gradually—not too fast (to avoid erratic pricing which would confuse users and may push them away), and not too slow (to adequately react to changing circumstances). The proposed pricing seems like a good first iteration. Alternatively, the system may utilize a commonly practiced ad bidding model.

Pricing of ads may fit into a supply-demand model. As a result, the price for ads will truly be driven by the market, and may become relatively cheap or relatively expensive depending on market conditions. On the other hand, there could be unlimited number of listings for a given number of available views. The base price of a listing for a time slot is fixed—this is an arbitrary number set by Oithis.

For ads only, if the number of views purchased greatly exceeds the number of estimated views, the application may display 2 or 3 ads at once instead of one.

For every listing and every ad, the application also may slightly increase the final listing/ad price based on the amount of storage and projected bandwidth usage such listing or ad may incur. The storage is used for the listing/ad HTML text, images, videos, documents, etc. The estimated bandwidth is calculated based on estimated number of views. To be fair, this additional surcharge should not depend on market driven indicators, but should relate to storage and bandwidth demands only.

Historical data is also used to aid the users in their decision making when placing listings/ads. This includes metrics showing a breakdown of number of views for a given OI including the estimated number of views for the specified duration. This also includes showing the actual searches done by various users for a given OI—such information can give a clue as to what those users are looking for (side point: users doing searches need to be informed that their searches—without any user identifying information—may be viewed by other users who are doing research prior to placing listings/ads).

While any given listing/ad is active as well as after they expire, users who placed them should be able to view related metrics in order to adjust their future actions. These should include the actual number of views, the number of clicks, the prices paid, purchase amounts, etc.

Automatic Removal of Low Quality OIs

OI ratings are reviewed by the application on a monthly basis. An OI Rating Poll is considered meaningful if at least a certain number (e.g., 1%) of users who viewed an OI participated in OI Rating Poll, and if the poll has at least a certain number votes (e.g., 10). A Public OI whose rating is meaningful and stays at the level of below 3.0, for example, for at least a month becomes subject to a gradual termination process which only stops if such OI rating goes to 3.0 or above during any 7 days period. Such process takes 60 days during which time an OI becomes disabled and inaccessible periodically with progressively increased intervals. On the first day of such period, an OI is disabled for 1 min every hour, on the next day—for 2 min every hour, etc. until it is completely disabled after 60 days. While an OI is disabled, a corresponding explanation is displayed instead of normally shown OI view. After 60 days, an OI is removed from the system.

Challenging OI Admin

A user may challenge a public OI admin. Only a user who satisfies the following requirements is allowed to do so. Has to be registered for at least 30 days. Has at least 90% approval rating from at least 10 other users.

The application allows only one challenge at a time. A new challenge may not start during the 7 day period following the end of the previous challenge for the same OI Admin position.

Once a user initiates a challenge, the application automatically creates a new Post along with Approval Poll for the challenger. The challenger must supply his point of view in the post. All users who viewed this OI at least once during the period which ended 7 days prior to the start of this challenge are automatically notified. They are invited to vote and express their opinion.

After 7 days, the application checks the poll results. If at least 10 users or at least 25% of notified users (whichever is greater) voted, and the challenger's approval reaches at least 67%, he automatically becomes the new Admin.

If the former admin disagrees, the only choice is to challenge the newly elected admin.

Challenging a Public OI's Scope

When a new public OI is created, it may have exactly the same name as the names of other public OIs—so long as their internal scopes do not intersect. However, if their internal scopes do intersect (e.g., the OIs share one or more similarities), the new OI admin has two choices. The internal scope of the new OI can be changed to avoid the conflict. The new OI admin may challenge all conflicting OIs and request from their admins to reduce their internal scopes to accommodate the new OI with the same name. The challenge is only allowed if the new OI's internal scope is at least 50% less than the smallest conflicting OI's internal scope.

In the latter case, the application notifies all conflicting OI admins of the challenge. Then follows a 7 day resolution period during which conflicting OI admins have a chance to work things out. During this period, any OI admin is free to adjust the internal scopes of their OIs to resolve the conflict. If by the end of the resolution period the conflict is not resolved, the system automatically reduces the internal scopes of other conflicting OIs in order to resolve the conflict.

During the resolution period, the new OI admin has to select a non-conflicting internal scope for the new OI.

Ratings and Rewards

The application assigns a privacy flexible approval poll to every OI, to every user, and to every listing throughout the system. Any user is free to cast their vote as they see fit. Restrictions may be imposed to prevent abuse. Such approval ratings can be viewed throughout the application for every OI, every user, and every listing. When displaying a list which consists of OIs, users, or listings, the application shows the higher rated items first. At the least, the users should be able to sort the displayed items by their ratings.

When a user casts the vote of approval to another user he can optionally reward the other user by paying a small amount to such user (e.g., anywhere between about $0.01-$0.05). The payment is drawn from the user's credits first, and if there are no credits left, than it is drawn from the user's money balance. The deposit is always made to the other user's credits.

Searching for OIs, Users and Listings

This has to be presented via an intuitive behavior. The user should be able to filter out screen views by the criteria below.

Search Scope. It defaults to the user's scope if the user did not provide an active external scope.

OI Name. These are words which should match words in OI name in any order. The matching is not case sensitive. Every search word can be partial—the end of the word can be truncated. E.g. "cam digi" should match an OI name "Digital Cameras". If omitted, any OI Name is a match.

OI Characteristics. A user should be able to search and find characteristics among those which match the Search Scope, and specify one or more such characteristics which should match the resultant OI characteristic. A user should be able to exclude items based on certain characteristics.

Rating. Specify to only show OIs of the specified rating or above.

Intent. Users may select User Intents—i.e., what the user is looking for—which is the opposite of OI's intent, and display those instead of OI's intents, or display both at the same time to avoid confusion. For example, if the user's intent is to Buy something, the user is looking for a listing offering to Sell something. An intent Trade is unidirectional in this respect.

Listing Title. These are words which should match words in Listing title in any order. The matching is not case sensitive. Every search word can be partial—the end of the word can be truncated. E.g. "cam digi" should match a listing title "Digital Cameras". If omitted, any listing title would be a match.

Search Scope

The general approach may be that users assign themselves narrow scopes, while other OIs and Listings may be assigned wide scopes. As a result, when searching for OIs and Listings, there is no need for users to create an extra "search" scope.

However, if looking for other users, the search scope needs to be as wide as necessary.

Following OIs and Users

A user may choose to follow any OI, and specifically any OI related component. When OI related information changes, the user is notified (e.g. via an email and/or SMS). A user may elect the minimum time interval between such notifications to avoid frequent notifications.

A user may choose to follow any other user in respect to any non-private activity of such user, and even for a specific activity such as making a post, replying to a post, placing a listing, voting (except private votes), creating an OI, etc. When such non-private activity is detected, the user is notified (e.g. via an email and/or SMS). A user may elect the minimum time interval between such notifications to avoid frequent notifications.

Web Links to OIs, Listings, Polls, and Users

There may be an easy way to provide links to OIs in the form www.oithis.com/<OI Name>/<Optional Details>. Spaces need not be imposed in OI name. For example, when entering the following string with spaces into an Internet browser address window: "www.oithis.com/sample of name". The browser automatically replaces spaces with its hexadecimal encoding as follows: "http://www.oithis.com/sample %20oi%20name".

The problem is that supplying an OI name only is not enough to identify an OI. In general the application needs to know whether an OI is public or private, and what is the scope. The application may show both public and private names if both exist. As to the scope, the application may assume geographical location and language based on IP address, any age, and all genders. Alternatively, the system may allow to provide Optional Details in order to narrow down and identify a specific OI (e.g. a unique global OI Identification, or a unique OI sequence number within a group of OIs with the same name).

Links to specific listings, polls, users, and selected content are presented as traditional web links.

'OI-This' Buttons and Other Link Backs

There should be a way to provide buttons to third parties so that web content could be linked back to a certain OI. For example, a user who is looking for cameras is browsing a third party website, and notices that such website provides detailed and useful information in how to choose a camera. The user wants to add this website to 'Related Websites' for an OI he frequents. Assuming the owner of a third party website implemented such link back button, the user can press on it, and in a few steps submit a request to an OI Admin to add this website to 'Related Websites'.

Figure 4:
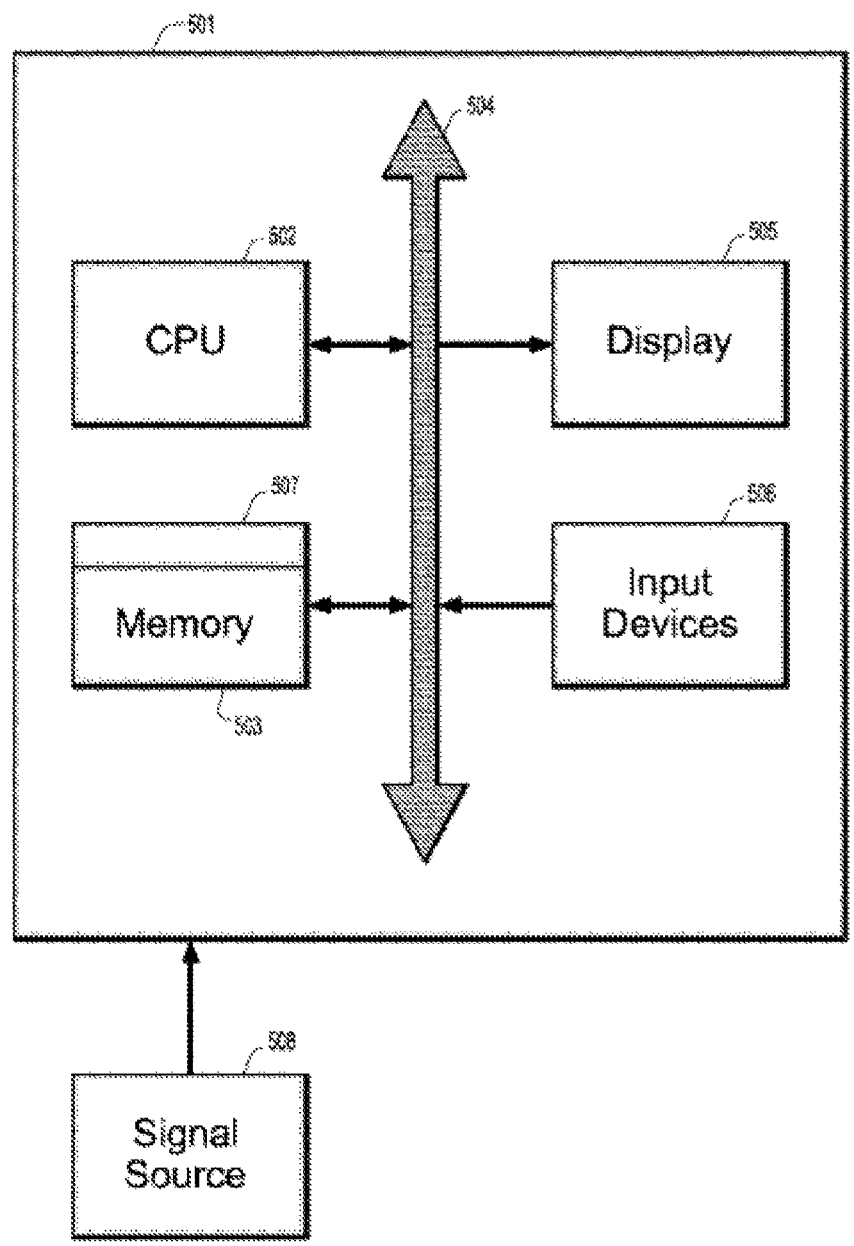
FIG. 4 is a computer system for implementing a method according to an exemplary embodiment of the present invention.

More particularly, referring to FIG. 4, according to an exemplary embodiment of the present disclosure, a computer system 501 for data structure organization and searching using basic atomic units of information can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 stored in memory 503 (e.g., a non-transitory computer-readable storage medium) and executed by the CPU 502 to process the signal from the signal source 508. As such, the computer system 501 is a general-purpose computer system that becomes a specific purpose computer system when executing the routine 507 of the present invention.

The computer platform 501 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Intended Audience

Object's Intended Audience is equivalent to Internal Scope. For a user, such audience should be interpreted as 'Audience a user belongs to'.

Audience of Interest

User's Audience of Interest is equivalent to External Scope. User is utilizing his/her Audience of Interest when looking for OIs, Listings, or other Users.

Oithis Informational Network (OIN)

A collection of OIs, Listings, Users, and Characteristics accessible to a user by means of searching for and viewing, and not requiring any type of entering/exiting action, such as but not limited to, log-in/log-out, comprises Oithis Informational Network (further referred to as OIN).

Every OIN is given a name as explained further below.

Global OIN

Global OIN is the default OIN available to the general public which deploys Oithis Application on the public network such as The Internet. Global OIN is managed by Oithis Application Owner.

Global OIN may be given a name by it owner. For example, 'Global Oithis'.

Designated OIN

Any OI, Listing, or User may be assigned its Designated OIN by the owner/admin of such Oi, Listing, or User respectfully.

Every Designated OIN has the same name as its parent Oi, Listings, or User respectfully.

A newly created Designated OIN has no OIs, Listings, Users, or Characteristics.

A user may enter/exit such Designated OIN. Permissions to enter, required authentication, and Designated OIN settings and behavior are all controlled and managed by the owner/admin of such parent Oi, Listing, or User respectfully.

Secure OIN

A specific secure method of deployment of Oithis Application such as, but not limited to, a range of originating IP addresses may be assigned its Secure OIN by Oithis Application Owner and per request of an entity such as a person, organization, or a company.

A newly created Secure OIN has no OIs, Listings, Users, or Characteristics. Permissions to enter, required authentication, and Secure OIN name, settings and behavior are all controlled by an entity which requested and then owns such Secure OIN.

Nested OIN

Any OI, Listing, or User of any OIN may be assigned its Designated OIN, which in turn may have its own Ors, Listings, and Users as explained above. Such iterative process may be repeated a number of times, effectively establishing a hierarchy of Nested OINs. The only way to reach a nested (child) OIN is to first enter its parent OIN, then find OI hosting such OIN, and finally enter such OIN. Use of Nested OIN structure to maintain a wealth of information may be suitable for a company or organization with multiple branches or departments. All information common to all departments resides within a single parent OIN. However, each branch or department has its own Designated OIN with its own rules and authentication which is controlled by its respective branch or department.

Informational Real Estate

Collection of existing and potential OINs, along with their OIs, Listings, Users, and Characteristics form Informational Real Estate. It is vast, and most of it is unclaimed. However, it is not unlimited when it comes to OIs because every OI is given a meaningful name and an Intended Audience which should not conflict with Intended Audience of any other OI with the same name and type. Similar to traditional real estate, any piece of Informational Real Estate can be created, developed, abandoned, claimed, transferred, bought, and sold.

Pause Authentication while Typing

A User may elect to purposefully pause for a moment after specific characters while entering authentication information such as, but not limited to, log-in information. For example, user id and/or password.

If Pause Authentication is elected, a software application confirms user's pause by some sort of visual indicator such as, but not limited to, blinking and/or change of color, and then utilizes such pause as part of authentication process. There should be a provision to resume data entry after an unintentional pause. For example, the use of a single backspace character. Also, a natural pause may be present at the end of such entry, after the very last character is entered.

If elected, Pause Authentication slightly delays user's entry, for example, by 1.5 seconds for each pause. However, it provides an important anti-hacking benefit. For example, even knowing a password, a hacker would have to try multiple combinations by using the password without a pause, and then using the same password with a pause after different characters, and with multiple pauses after different characters. Not only this increases the number of password/pause combinations a hacker has to try, but it also greatly increases the time needed to try each combination.

For example, a hacker who learned someone's password, which is eight characters long on average, can try to log-in with such password utilizing automated software. Data entry itself is automated and quick. Therefore, the time required to try a specific log-in is mostly determined by how quickly a software application replies with 'invalid login' response, which usually takes less than a second. After that, a hacker's automated software would move on to the next target such as another user's authentication data.

If Pause Authentication is utilized, a hacker would have to make one attempt to use the password without a pause, then make another seven attempts to use a single pause after the $1^{st}$, $2^{nd}$, $3^{rd}$, $4^{th}$, $5^{th}$, $6^{th}$, and $7^{th}$ character, and then make other attempts while using two, or more pauses after different characters, and so on.

The longer the password, the more combinations a hacker has to try. The number of combinations grows factorially, which is greater than exponentially. A reasonable artificial pause of about 1.5 seconds may add many seconds or even minutes needed to try a single password.

In the event of multiple unsuccessful login requests, user's account may be locked by a software application, which effectively prevents further hacking attempts while at the same time notifying a potential victim of such attempts via an automated email, which typically every software application would issue in such a case.

If a user deploys Pause Authentication for both user id and password, the number of combinations and the time required to try them grows by a few orders of magnitude.

Non-Graphical Reference to Partial Geographic Area (NGR-PGA)

An imaginary stretchable rectangular blanket of any ratio between its sides, and consisting of certain number of rectangular strips of the same height fully and exactly covering the blanket, each in turn consisting of certain number of rectangles of the same dimensions fully and exactly covering each such strip, totaling number of rectangles as multiplication of the number of strips by the number of rectangles in each strip, is laid over a geographic area of any shape, and then stretched and shrunk in various points in order to completely cover such geographic area while not extending beyond its borders, allows to achieve NGR-PGA.

For example, utilizing three strips with three squares in each strip, the imaginary stretchable rectangular blanket will have total of nine squares whose relative location to each other is similar to numbers 1-9 on a phone keypad. Squares of the first row are numbered 1, 2, and 3. Squares of the second row are numbered 4, 5, and 6. Squares of the third row are numbered 7, 8, and 9.

While it may be difficult to determine the exact shape of each of the nine squares after the blanket was stretched as described above, it is possible to refer to different parts of the geographic area by numbers only, using only one number to refer to any ⅑th of the geographic area, using any two numbers to refer to ⅔th of the geographic area, using any three numbers to refer to ⅗th of the geographic area, etc. and using all 9 numbers to refer to the entire geographic area.

Northern part of the geographic area can be referred to as 1-2-3. Southern part of the geographic area can be referred to as 7-8-9. Eastern part of the geographic area can be referred to as 3-6-9. Western part of the geographic area can be referred to as 1-4-7.

North-Eastern part of the geographic area can be referred to as 3, North-Western part—as 1, South-Eastern part—as 9, and South-Western part—as 7. The central part of the geographic area can be referred to as 5.

The entire geographic area excluding the Northern part could be referred to as 4-5-6-7-8-9. The entire geographic area excluding the Southern part could be referred to as 1-2-3-4-5-6. The entire geographic area excluding the Western part could be referred to as 2-3-5-6-8-9. The entire geographic area excluding the Eastern part could be referred to as 1-2-4-5-7-8. The entire geographic area excluding the middle part could be referred to as 1-2-3-4-6-7-8-9. And so on.

Utilizing numbers 1-9, total of 511 differently shaped partial geographic areas can be referred to. For any other number N different than 9, the total number of differently shaped geographic areas would be (N**2−1).

As this applies to a software application, a geographic area which is smaller than any commonly known geographic area such as ZIP/postal code, city, county, metro area, state/province, country, continent, or a planet, can be referred to utilizing NGR-PGA.

In-Application User Generated Text Stereograms

A software application may include a built-in text stereogram generator which presents user-provided text as a 3-dimensional text floating above or below a flat background consisting of random characters, while the entire 3D presentation appears to be deep inside computer screen.

Such stereogram may consist of ASCII characters or any other known set of characters. It may adhere to UTF-8 or any other known character encoding. However, it does not include any graphical presentation which cannot be described through characters.

Such stereogram generator may be invoked and viewed without activating another software application.

Such stereogram presentation may be invoked and viewed without any significant body movements. On the contrary, invoking and viewing such stereogram presentation may be achieved via a typical computer interaction such as, but not limited to, typing, speaking, movement of eyes, controlling a mouse pointer, utilizing a finger, a hand, and/or viewing the screen.

At any time, a user who is working with such software application may request such stereogram presentation as soon as desired, effortlessly, and in a matter of seconds. Such ease of use enables a user to utilize such stereograms as often as desired.

Such stereogram presentation may be shared with others by providing a URL-based link to the software application. Such link can be shared via a social media, email, or text messaging. Following such link from any other computer or device invokes such software application, which immediately and without any further input from the user presents to a user a text stereogram with the original user provided text, having the same or different background characters.

Such stereogram presentation may be adjusted via the same software application including, but not limited to, font size, font color, character spacing, and perceived depth of 3D presentation.

Such stereogram presentation may be copied, and pasted into any other software application with a fixed size font such as Courier New, and even printed and saved in a file, while still preserving the stereo effect.

Such stereogram presentation may be used to conceal sensitive information which can be expressed through characters.

Average American spends more than two hours daily in front of a computer screen. A professional utilizing a computer as part of the job, spends at least eight hours daily in front of a computer screen. Staring at a screen for such prolonged periods of time is known to cause eyestrain, dry eyes, headache, fatigue, difficulty focusing, blurred vision, and shoulder and neck pain.

Stereograms are often used for vision therapy. Observing a stereogram periodically, for a period of time ranging between a few seconds and a few minutes, is known to improve vision and reduce eye fatigue.

Some people are able to calm their mind and relax their body while viewing a stereogram, reaching a mental state similar to that with yoga, meditation, and stress management. Viewing a stereogram may be beneficial to many people since it stimulates multiple aspects of vision in a fun and rewarding way.

The ease of invoking text stereograms as described above enables a user of such software application to effectively counter negative effects of a prolonged interaction with a computer/device screen.

The foregoing and with reference to the tables, figures and drawings, those skilled in the art will appreciate that certain modifications can also be made to the present disclosure without departing from the scope of the same. Therefore, the above description should not be construed as limiting, but merely as exemplifications of particular embodiments of the present invention.

What is claimed is:

1. A computer-implemented method for organizing data using basic atomic units of information, the method comprising:

generating a plurality of objects of interest (OIs), wherein an object of interest (OI) of the plurality of OIs comprises an OI name and an OI description, wherein the OI is a basic atomic unit of information, and the OI comprises an OI scope comprising a first geographic area and a first age scope, wherein the OI scope defines a relevant audience for an OI, and wherein data associated with the OI is searchable;

assigning one or more characteristics to the OI, wherein the one or more characteristics of the OI, the OI name, and the OI description are searchable;

searching for at least one OI by defining a search scope including a second geographic area and a second age scope;

identifying a first OI having overlapping first and second geographic areas and overlapping first and second age scopes, wherein the first OI is controlled by a first administrator;

generating a second OI having a second OI name that is identical to the OI name of the OI of the plurality of OIs generated, wherein the second OI has a second OI scope comprising a third geographic area at least partially overlapping the first geographic area, wherein the third geographic area is smaller than the first geographic area, wherein the second OI is controlled by a second administrator different from the first administrator;

reducing a size of the first geographic area to eliminate overlapping between the first geographic area and the third geographic area;

transferring control of the first OI from the first administrator to the second administrator or transferring control of the second OI from the second administrator to the first administrator after reducing the size of the first geographic area to eliminate overlapping between the first geographic area and the third geographic area.

2. The computer-implemented method for organizing data using basic atomic units of information of claim 1, wherein the OI name includes 120 characters or less.

3. The computer-implemented method for organizing data using basic atomic units of information of claim 1, wherein the OI is a name of a person.

4. The computer-implemented method for organizing data using basic atomic units of information of claim 1, wherein the characteristics include a numerical value or a numerical range.

5. The computer-implemented method for organizing data using basic atomic units of information of claim 1, wherein the first or second geographic areas are defined by drawing a polygon.

6. The computer-implemented method for organizing data using basic atomic units of information of claim 1, further comprising creating listings for goods or services associated with the OI, wherein the listings are visible to the plurality of users.

7. The computer-implemented method for organizing data using basic atomic units of information of claim 1, wherein the plurality of OIs are divided into public OIs and Private OIs.

8. The computer-implemented method for organizing data using basic atomic units of information of claim 1, further comprising applying system characteristics and non-system characteristics to the OI, wherein the system characteristics are assigned by the system and are not visible to users, and the non-system characteristics are visible to users.

9. The computer-implemented method for organizing data using basic atomic units of information of claim 1, wherein the OI comprises posts, polls, websites, pictures, videos, audio or documents.

10. The computer-implemented method for organizing data using basic atomic units of information of claim 1, wherein the OI comprises description, reviews, forum, related OIs, listings or users.

* * * * *